No. 675,342. Patented May 28, 1901.
R. J. SAYERS.
SYSTEM OF PLUMBING.
(Application filed July 10, 1900.)
(No Model.)
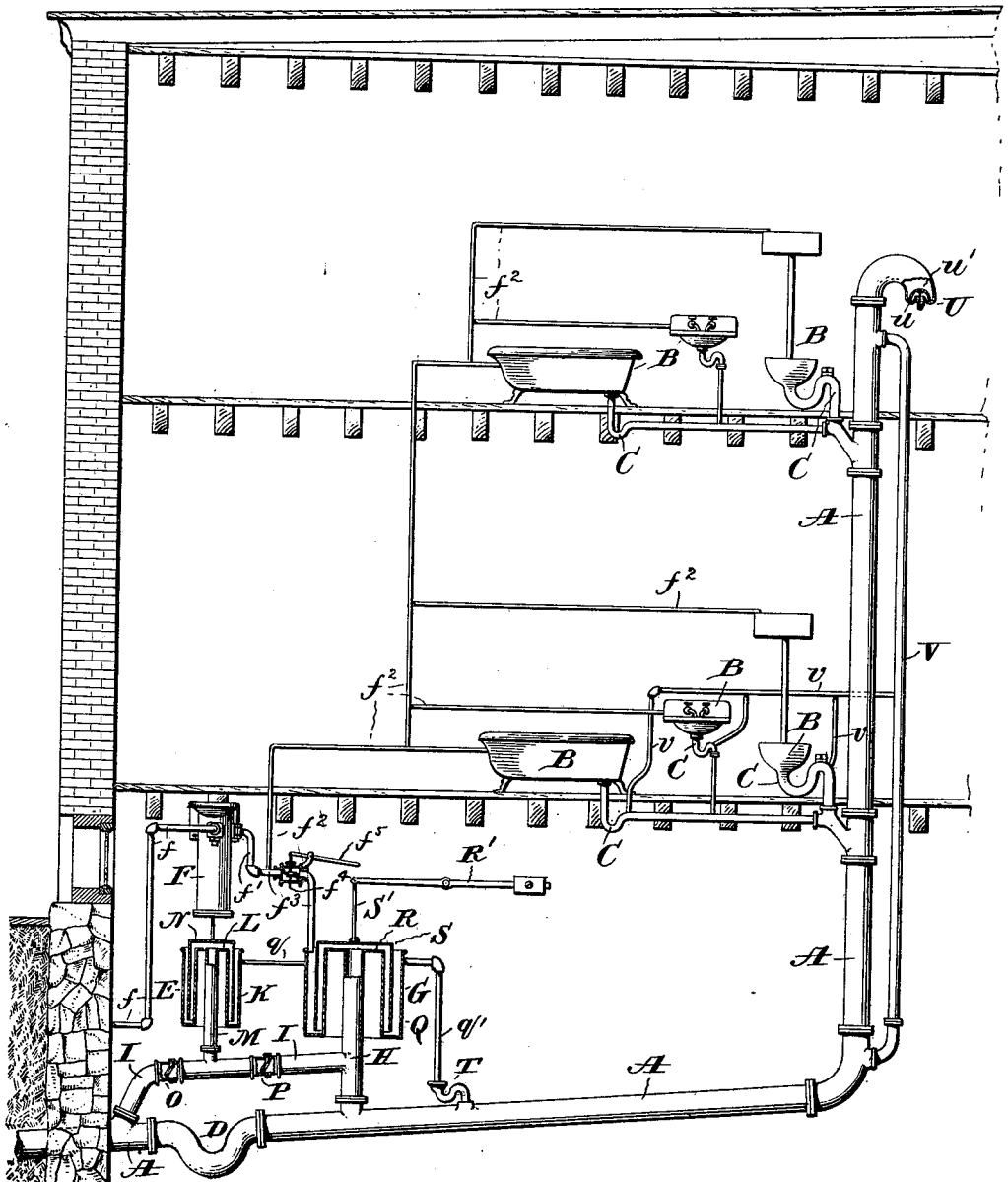

UNITED STATES PATENT OFFICE.

ROWLAND J. SAYERS, OF NEWBURGH, NEW YORK, ASSIGNOR OF ONE-HALF TO ALBERT C. SMITH, OF SAME PLACE.

SYSTEM OF PLUMBING.

SPECIFICATION forming part of Letters Patent No. 675,342, dated May 28, 1901.

Application filed July 10, 1900. Serial No. 23,136. (No model.)

*To all whom it may concern:*

Be it known that I, ROWLAND J. SAYERS, of Newburgh, in the county of Orange, and in the State of New York, have invented certain new and useful Improvements in Systems of Plumbing; and I do hereby declare that the following is a full, clear, and exact description thereof, reference being had to the accompanying drawing, in which is shown a vertical sectional view of my system of plumbing applied to a dwelling.

The objects of my invention are to provide a system of plumbing which, while specially adapted for use in dwellings, shall also be applicable to other uses and which shall have the qualities, among others, of being odorless and sanitary in the highest degree, of requiring a minimum of piping, and of avoiding the necessity of carrying pipes above the roof of the dwelling; and to such ends my invention consists in the system of plumbing hereinafter specified.

In the systems of plumbing commonly in use there is a pressure within the system which is usually as great as and is sometimes greater than that of the atmosphere, the result being that sewer-gas escapes from the system into the surrounding air whenever through a rush of water, as from a flush-tank, a trap is momentarily emptied and that such gas escapes from any leak that may occur in the system. The ordinary systems also are ventilated by means of pipes or stacks extending above the roof of the building, and such pipes are expensive and mar the architecture of the building.

In order to overcome the above-mentioned and other objections to the other systems of plumbing with which I am familiar, I have devised a system in which is maintained a vacuum or partial vacuum, so that there is no tendency for sewer-gas to escape from the system except by the intended outlet; but instead the outer air will be drawn into the system at a leak.

In carrying my invention into practice I run a waste-pipe A from the sewer into the house and connect it with each of the fixtures B and B. One of each of the usual traps C and C is located between the waste-pipe and each fixture. Between the lowest fixture and the sewer a trap D is placed in the waste-pipe.

In order to maintain a vacuum or partial vacuum in the system, I provide some form of apparatus for exhausting the gases from the waste-pipe. The form of exhausting apparatus which I have chosen for illustration consists of a gas-pump E, operated by a water-motor F, the action of the latter being controlled to some extent by a regulator G. It is obvious, however, that any other form of exhausting apparatus could be used in the place of that shown. On the side of the trap toward the fixtures a vertical pipe H is connected to the waste-pipe A, and such pipe is indirectly connected to the gas-pump by a horizontal pipe I. The latter pipe is shown as connected to the waste-pipe on the side of the trap toward the sewer; but it can be extended in any other direction in which it is desired to convey the gases expelled by the gas-pump. The gas-pump comprises an annular trough K, suspended from the outer edge of an annular disk L, said disk being supported on the upper end of a vertical pipe M, whose lower end is connected to the pipe I, and an inverted cup N, whose lower edge is received in the trough K. The cup N is caused to reciprocate vertically by the water-motor F. Valves O and P are placed in the pipe I on each side of the connection of the pipe M, said valves permitting the gases to pass only in one direction through the pipe I. The supply-pipe $f$ for the water-motor is connected with the water-mains, and the exhaust-pipe $f'$ of such motor has two branches, one of which, $f^2$, is connected with the faucets and valves of the various fixtures of the house, and the other of which, $f^3$, runs to the regulator. A valve $f^4$, operated by a lever $f^5$, is interposed in the exhaust-pipe $f^3$. The regulator is mounted on the upper end of the pipe H, and comprises an annular trough Q, which is suspended from the outer edge of an annular plate R, that is mounted on the top of the pipe H. A pipe $q$ connects the troughs of the gas-pump and regulator. An inverted cup S is received in the annular trough Q and is suspended from a weighted lever R' by a link S'. The weight on the lever is slightly greater than the weight of the cup S. The branch $f^3$ of the exhaust-pipe empties into the annular trough Q. An overflow-pipe $q'$ runs from the trough Q to an open trap T in the waste-pipe A. In order to prevent the formation of a vacuum great enough to unseal the traps, it is desirable to admit air to the system when the decrease of pressure in the system has passed the desired point. For such purpose an air-valve U is mounted in an inverted elbow at the upper end of the waste-pipe. Such valve comprises an annular trough $u$, formed in the open end of the elbow. An inverted cup $u'$ is seated in such trough, and the trough is filled with a liquid, as mercury, water, or oil. The weight of the cup $u'$ is sufficient to prevent the pressure of the outer air from raising said cup until the vacuum within the system has become greater than is desired. At such time the air will pass up under the cup and decrease the vacuum. The air-valve is preferably located at the upper end of the waste-pipe; but it can, if desired, be located at any other point in the system where it is in direct communication with the waste-pipe. To facilitate the ventilation of the system, I preferably connect the ends of an air-pipe V respectively above and below the highest and lowest fixtures. Branches $v$ and $v$ extend from the air-pipe to the upper bends of the traps of the fixtures. The pipe V and its branches $v$ and $v$ can be omitted if desired.

In the operation of my system water is turned on at the motor supply-pipe $f$ and flows through the waste-pipe $f'$ and fills the branches thereof. If the vacuum in the system be too slight, the weight on the lever R will raise the cup S and cause the lever to strike the lever $f^5$, allowing the water to flow through the regulator and escape by the trap T. The trough of the regulator is thus filled, and the water by the pipe $q$ fills the trough of the air-pump. The passage of the water through the water-motor causes the gas-pump to be operated to exhaust the gases from the entire system on the house side of the trap until the pressure of the outer air on the top of the cap of the regulator causes it to draw the weighted lever down from contact with the lever $f^5$, thus stopping the operation of the water-motor and preventing further exhaustion of the gases in the system. Since the branch $f'$ of the exhaust-pipe of the water-motor is connected with the faucets and fixtures of the house, whenever water is drawn from them the motor is caused to operate and the vacuum is thus caused to be maintained, notwithstanding any ordinary leakage in the system. Before, however, the gases in the system can be exhausted to a point where there is danger of the outer air forcing the water from the traps into the waste-pipe, and thus unsealing the traps, air will raise the cup of the air-valve and enter the system until the desired degree of difference between the pressures within and without the systems has been restored.

When a water-closet is emptied, a column or "plug" of water passes down the waste-pipe and acting like a piston may tend to cause a compression of gases between it and the trap D to a point beyond the normal degree of vacuum of the system. In such case the cup of the regulator will rise and by thus increasing the capacity of the system will maintain the normal degree of vacuum. In rising with the cup S the lever will come in contact with the lever $f^5$ and set the water-motor in motion and the gases will again be exhausted to the normal degree, after which the cup will draw down the lever and cause the motion of the water-motor to cease.

It will be seen from the above description that my system has, among other advantages, the following: By maintaining a vacuum or partial vacuum within itself my system prevents all outward leakage of the gases within the system. Instead of such action a leak can only cause a greater amount of the outer air to pass into and ventilate the system. By placing the air-valve at the upper end of the system all air that enters thereby passes through the entire length of the waste-pipe, causing ventilation throughout the entire length thereof. The water by which the motor is operated being mainly the water that is drawn from the fixtures is available, practically without expense, for the purpose of operating the motor. As the pipes of my system need pass no higher than the highest fixture, there are no pipes or stacks to be carried above the roof. Where there are several branches to the waste-pipe, an air-valve will preferably be placed at the upper or farther end of each such branch, so that air will be admitted at every "dead end" of the waste-piping.

Should a suction or vacuum occur in the waste-pipe on the sewer side of the trap D, gases will pass through pipe I and relieve the suction or vacuum without danger of siphoning out or emptying the sealing-water in the said trap.

Having thus described my invention, what I claim is—

1. In a sealed system of plumbing, the combination with means for maintaining a vacuum or partial vacuum therein, of traps between such means and the fixtures of said system, and means for regulating such vacuum so that the traps shall not be emptied, substantially as and for the purpose set forth.

2. In a sealed system of plumbing, the combination with means for exhausting gases therefrom, of traps between such means and the fixtures of said system, and means for regulating the action of such first-mentioned means, so that the traps shall not be emptied, substantially as and for the purpose set forth.

3. In a sealed system of plumbing, the combination with means for exhausting gases therefrom, of traps between such means and the fixtures of said system, and means for regulating the action of such first-mentioned means by the degree of exhaustion within the system, so that the traps shall not be emptied, substantially as and for the purpose set forth.

4. In a system of plumbing, the combination with means for exhausting gases therefrom, of means for causing the operation of such first-mentioned means when the pressure in the system is above the normal pressure of the system, and for causing such first-mentioned means to cease action when the pressure in the system is below the normal pressure of the system, and means for admitting air to the system when such pressure is below the normal pressure of the system, substantially as and for the purpose described.

5. A system of plumbing, comprising fixtures and piping, in combination with traps for said system, and automatic means for increasing the capacity of the system when it is filled, or partly filled with waste matter, such means being operable when the pressure in the system is less than that necessary to empty the traps, whereby an excess of pressure on such traps is prevented, substantially as and for the purpose described.

6. In a system of plumbing, the combination with a waste-pipe, of a trap therefor, and automatic means above such trap for increasing the capacity of the system when said system is filled, or partly filled with waste matter, such means being operable when the pressure in the system is less than that necessary to empty the traps, whereby excessive pressure on such trap is prevented, substantially as and for the purpose described.

7. In a system of plumbing, the combination with means for exhausting gases therefrom, of means for increasing the capacity of the system when such system is filled or partly filled with waste matter, substantially as and for the purpose described.

8. In a sealed system of plumbing, the combination with means for exhausting gases therefrom, of means for increasing and decreasing the capacity of the system to maintain a substantially uniform vacuum or partial vacuum in the system, substantially as and for the purpose described.

9. In a liquid-sealed system of plumbing, the combination with a chamber therein, of automatic means for moving a wall of such chamber to change the capacity thereof when the system is filled or partly filled with waste matter, substantially as and for the purpose described.

10. In a system of plumbing, the combination with a waste-pipe, of a trap therefor, and a movable wall above the trap that is held in balanced position, and that is moved from such position by the compression of air in the system due to the introduction of waste material, substantially as and for the purpose described.

11. In a system of plumbing, the combination of two vessels telescoped together, such vessels being closed at opposite ends, means for sealing the joint between said vessels, a pipe connecting the space inclosed by such vessels with the system of plumbing, and means for drawing such vessels apart when the system is filled or partly filled with waste matter, substantially as and for the purpose described.

12. In a system of plumbing, the combination with a gas-exhausting apparatus connected with the waste-pipe of such system, of a regulator for said exhausting apparatus consisting of a vessel slidably mounted within another vessel, means for sealing the joint between such vessels, a pipe connecting the space inclosed by said vessels with such waste-pipe, means tending to draw said vessels apart, and means whereby the motor of the exhausting apparatus is controlled by the position of such movable vessel, substantially as and for the purpose described.

13. In a system of plumbing, the combination with a gas-pump connected with the water-pipe thereof, of a water-motor therefor, a valve for controlling said motor, an annular trough, a disk closing the space within the inner wall of such trough, a pipe passing through said disk and connected with the waste-pipe of such system, an inverted cup having its edge within said trough, and a weighted lever supporting such cup, said lever being adapted to come into contact with such valve when said cup is raised in such trough, substantially as described.

14. In a system of plumbing, the combination with the waste-pipe thereof, of a trap in such pipe, a pipe connected with said waste-pipe on opposite sides of such trap, and means for forcing the gases in said waste-pipe through such second-named pipe, substantially as and for the purpose described.

15. In a system of plumbing, the combination with the waste-pipe thereof, of a trap in such pipe, a pipe connected with said waste-pipe, on opposite sides of such trap, means for forcing the gases in such waste-pipe through such second-named pipe, and means for preventing the return of said gases, substantially as and for the purpose described.

16. In a system of plumbing, the combination with a gas-pump and a regulator therefor, each of which is sealed with water, of a motor for operating said gas-pump, and means for conveying waste water from such motor to said pump and such regulator to seal the same, substantially as and for the purpose described.

17. In a sealed system of plumbing, the combination with means for exhausting gases therefrom, such means being connected with the waste-pipe below the fixtures, of traps between such means and said fixtures, and an air-inlet valve at the upper end of the waste-pipe, so that the traps shall not be emptied, substantially as and for the purpose set forth.

18. In a sealed system of plumbing, the combination with means for exhausting gas from the waste-pipe of such system, of traps for the fixtures, pipes connecting the upper bends of said traps with such waste-pipe, and means for regulating such exhausting means so the traps shall not be emptied, substantially as and for the purpose set forth.

19. In a sealed system of plumbing, the combination with means for exhausting gas therefrom, of traps between such means and the fixtures of the system, and a motor for said means, such motor being operated by water that is permitted to flow in the use of any one of two or more fixtures of the system, substantially as and for the purpose described.

In testimony that I claim the foregoing I have hereunto set my hand this 7th day of July, A. D. 1900.

ROWLAND J. SAYERS.

Witnesses:
E. J. STUKEY,
GEO. L. WOODWARD.